United States Patent
Martin (10) Patent No.: US 8,266,610 B2
(45) Date of Patent: *Sep. 11, 2012

(54) EXTENSION OF SWING MODULO SCHEDULING TO EVENLY DISTRIBUTE UNIFORM STRONGLY CONNECTED COMPONENTS

(75) Inventor: Allan Russell Martin, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 805 days.

This patent is subject to a terminal disclaimer.

(21) Appl. No.: 12/233,895

(22) Filed: Sep. 19, 2008

(65) Prior Publication Data

US 2009/0013316 A1  Jan. 8, 2009

Related U.S. Application Data

(63) Continuation of application No. 10/930,040, filed on Aug. 30, 2004, now Pat. No. 7,444,628.

(51) Int. Cl.
*G06F 9/45* (2006.01)
(52) U.S. Cl. .......................... 717/161; 717/154; 717/159
(58) Field of Classification Search .................... 717/161
See application file for complete search history.

(56) References Cited

U.S. PATENT DOCUMENTS

| | | | |
|---|---|---|---|
| 5,202,975 A | 4/1993 | Rasbold et al. | |
| 5,202,993 A | 4/1993 | Tarsy et al. | |
| 5,317,734 A | 5/1994 | Gupta | |
| 5,491,823 A * | 2/1996 | Ruttenberg | 717/161 |
| 5,557,761 A | 9/1996 | Chan et al. | |
| 5,664,193 A | 9/1997 | Tirumalai | |
| 5,809,308 A | 9/1998 | Tirumalai | |
| 5,835,776 A | 11/1998 | Tirumalai et al. | |
| 5,854,934 A * | 12/1998 | Hsu et al. | 717/161 |
| 5,867,711 A | 2/1999 | Subramanian et al. | |
| 5,987,259 A | 11/1999 | Goebel | |
| 6,044,222 A | 3/2000 | Simons et al. | |
| 6,260,190 B1 | 7/2001 | Ju | |
| 6,341,370 B1 | 1/2002 | Tirumalai et al. | |
| 6,615,403 B1 | 9/2003 | Muthukumar et al. | |
| 6,634,024 B2 | 10/2003 | Tirumalai et al. | |
| 6,651,247 B1 | 11/2003 | Srinivasan | |
| 6,671,878 B1 | 12/2003 | Bliss | |
| 6,718,541 B2 | 4/2004 | Ostanevich et al. | |
| 6,738,893 B1 | 5/2004 | Rozas | |
| 6,754,893 B2 | 6/2004 | Granston et al. | |
| 6,820,250 B2 | 11/2004 | Muthukumar et al. | |
| 6,832,370 B1 | 12/2004 | Srinivasan et al. | |
| 6,836,882 B2 | 12/2004 | Swoboda | |

(Continued)

OTHER PUBLICATIONS

Rau, B. Ramakrishna, "Interactive Modulo Scheduling", Nov. 1995, pp. 1-68, vol. 24, No. 1, Hewlett Packard Company 1995.

(Continued)

*Primary Examiner* — don wong
*Assistant Examiner* — Marina Lee
(74) *Attorney, Agent, or Firm* — Yee & Associates, P.C.; Libby Z. Toub (57) ABSTRACT

A method, apparatus, and computer instructions for scheduling instructions for execution. Identify a series of instructions in a loop, wherein the series of instructions has a cyclic data dependency. Determine whether the series of instructions is a uniform series of instructions. Schedule execution of the uniform series of instructions within the loop to optimize execution of the loop in response to the identified series of instructions being the uniform series of instructions.

14 Claims, 5 Drawing Sheets

U.S. PATENT DOCUMENTS

| | | | |
|---|---|---|---|
| 6,892,380 B2 | 5/2005 | Granston et al. | |
| 6,912,709 B2 | 6/2005 | Helder et al. | |
| 6,986,131 B2 | 1/2006 | Thompson et al. | |
| 6,993,757 B2 | 1/2006 | Rajagopalan | |
| 7,007,271 B2 | 2/2006 | Kumar et al. | |
| 7,058,938 B2 | 6/2006 | Stringer | |
| 7,096,438 B2 | 8/2006 | Sivaraman et al. | |
| 7,302,557 B1 | 11/2007 | Hwu et al. | |
| 7,331,045 B2 | 2/2008 | Martin et al. | |
| 7,444,628 B2* | 10/2008 | Martin | 717/161 |
| 7,478,379 B2 | 1/2009 | Bonaventure et al. | |
| 7,487,336 B2 | 2/2009 | Bharadwaj et al. | |
| 7,493,611 B2* | 2/2009 | Martin | 717/157 |
| 7,617,495 B2 | 11/2009 | Muthukumar et al. | |
| 2002/0120923 A1 | 8/2002 | Granston et al. | |
| 2003/0200540 A1 | 10/2003 | Kumar et al. | |
| 2003/0208749 A1 | 11/2003 | Rajagopalan | |
| 2003/0233643 A1 | 12/2003 | Thompson et al. | |
| 2004/0163053 A1 | 8/2004 | Snider | |
| 2004/0177351 A1 | 9/2004 | Stringer | |
| 2004/0268335 A1 | 12/2004 | Martin et al. | |
| 2005/0216899 A1* | 9/2005 | Muthukumar et al. | 717/151 |
| 2005/0283772 A1 | 12/2005 | Muthukumar et al. | |
| 2006/0048123 A1* | 3/2006 | Martin | 717/160 |
| 2006/0048124 A1* | 3/2006 | Martin | 717/160 |
| 2006/0048125 A1 | 3/2006 | Martin | |
| 2009/0013316 A1* | 1/2009 | Martin | 717/161 |

OTHER PUBLICATIONS

Rau, B. Ramakrishna, "Interactive Modulo Scheduling: An Algorithm for Software Pipelining Loops", 1994 ACM, pp. 63-74, Hewlett Packard Laboratories, Palo Alto, CA, USA.

Codina et al., "A Comparative Study of Modulo Scheduling Techniques", Jun. 22-26, 2002, pp. 97-106, 2002 ACM, New York, NY, USA.

Sanchez et al "Modulo Scheduling for a Fully-Distributed Clustered VLIW Architecture", 2000, pp. 1-10, IEEE, Barcelona, Spain.

Zalamea et al., "Two-Level Hierarchial Register File Organization for VLIW Processors", 2000, pp. 1-10, IEEE.

Eichenberger et al., "Efficient Formulation for Optimal Modulo Schedulers", PLDI 1997, pp. 194-205, 1997 ACM, Las Vegas, NV, USA.

Zalamea et al., "Hierarchical Clustered Register File Organization for VLIW Processors", 2003, p. 10, Proceedings International Parallel and Distributed Processing Symposium, Los Alamitos, CA, USA.

Altman et al., "Optimal Modulo Scheduling Through Enumeration", Jun. 1998, pp. 314-344, vol. 26, No. 3, International Journal of Parallel Programming.

Llosa et al., "Reduced Code Size Modulo Scheduling in the Absence of Hardware Support", Nov. 2002, pp. 1-24, 35th Annual IEEE/ACM International Symposium on Microarchitecture (MICRO-35), Istanbul, Turkey.

Llosa et al., "Lifetime-Sensitive Modulo Scheduling in a Production Environment", Mar. 2001, pp. 234-249, vol. 50, No. 3, IEEE Transactions on Computers.

Leon, "Organization and Compiler Management of Register Files," Thesis, UPC. Universitat Politecnica de Catalunya, Barcelona, Spain, pp. 1-179, Sep. 2002.

Office Action, dated Dec. 31, 2007, regarding U.S. Appl. No. 10/930,039, 14 pages.

Final Office Action, dated Jun. 30, 2008, regarding U.S. Appl. No. 10/930,039, 13 pages.

Office Action, dated Dec. 10, 2008, regarding U.S. Appl. No. 10/930,039, 15 pages.

Notice of Allowance, dated Apr. 29, 2009, regarding U.S. Appl. No. 10/930,039, 13 pages.

Office Action, dated Jan. 10, 2008, regarding U.S. Appl. No. 10/930,040, 11 pages.

Response to Office Action, dated Apr. 10, 2008, regarding U.S. Appl. No. 10/930,040, 7 pages.

Notice of Allowance, dated Jun. 18, 2008, regarding U.S. Appl. No. 10/930,040, 13 pages.

* cited by examiner

| LOAD | gr1 |
| LOAD | gr2 |
| MULTIPLY | gr3 = gr1 * gr2 |
| COMPARE | cr1 = (gr3 == 0) |
| CONDITIONAL STORE | gr3 if (cr1 != true) |

FIG. 9  900

902 {
- LOAD  910 — gr1
- LOAD  912 — gr2
- MULTIPLY  914 — gr3 = gr1 * gr2
- COMPARE  916 — cr1 = (gr3 == 0)
- CONDITIONAL STORE  gr3 if (cr1 != true)   918

904 {
- 922 — LOAD  920 — gr4
- 922 — LOAD  gr5
- 924 — MULTIPLY  gr6 = gr4 * gr4
- 926 — COMPARE  cr1 = (gr6 == 0)
- 928 — CONDITIONAL STORE  gr6 if (cr1 != true)

906 {
- LOAD  930 — gr7
- LOAD  932 — gr8
- MULTIPLY  934 — gr9 = gr7 * gr8
- COMPARE  936 — cr1 = (gr9 == 0)
- CONDITIONAL STORE  gr9 if (cr1 != true)   938

908 {
- LOAD  940 — gr10
- LOAD  942 — gr11
- MULTIPLY  944 — gr12 = gr10 * gr11
- COMPARE  946 — cr1 = (gr12 == 0)
- CONDITIONAL STORE  gr12 if (cr1 != true)   948

| CYCLE | NUMBER OF USED GPRs AT START OF CYCLE |
|---|---|
| 0 | 2 |
| 1 | 4 |
| 2 | 4 |
| 3 | 5 |
| 4 | 3 |
| 5 | 3 |
| 6 | 2 |
| 7 | 3 |
| 8 | 1 |
| 9 | 2 |

*FIG. 14*

| CYCLE | NUMBER OF USED GPRs AT START OF CYCLE |
|---|---|
| 0 | 2 |
| 1 | 2 |
| 2 | 2 |
| 3 | 3 |
| 4 | 1 |
| 5 | 2 |
| 6 | 2 |
| 7 | 2 |
| 8 | 3 |
| 9 | 1 |

| NODE | CYCLE | NOTES |
|---|---|---|
| 4 | 2 | START IN CYCLE 2 DUE TO ARBITRARY START CYCLE SELECTION (NOT IMPORTANT) |
| 5 | 3 | |
| 9 | 4 | |
| 10 | 5 | |
| 14 | 6 | |
| 15 | 7 | |
| 19 | 8 | |
| 20 | 9 | |
| 3 | 1 | |
| 8 | 3 | |
| 13 | 5 | |
| 18 | 7 | |
| 1 | 0 | |
| 6 | 2 | |
| 11 | 4 | |
| 16 | 6 | |
| 2 | 0 | |
| 7 | 1 | CANNOT PLACE IN CYCLE 2 DUE TO NODES 4 AND 6 |
| 12 | -1 | CANNOT PLACE IN CYCLES 0 TO 4 DUE TO NODES 9, 11, 5, 8, etc |
| 17 | -2 | CANNOT PLACE IN CYCLES -1 TO 6 DUE TO NODES 14, 16, 10, 13, etc |

| NODE | CYCLE | NOTES |
|---|---|---|
| 4 | 2 | START IN CYCLE 2 DUE TO ARBITRARY START CYCLE SELECTION (NOT IMPORTANT) |
| 5 | 3 | SLACK CYCLES BETWEEN NODE 4 AND 5 = ((1*2)/8) - ((0*2)/8) = 0 |
| 9 | 4 | SLACK CYCLES BETWEEN NODE 5 AND 9 = ((2*2)/8) - ((1*2)/8 = 0 |
| 10 | 5 | SLACK CYCLES BETWEEN NODE 9 AND 10 = ((3*2)/8) - ((2*2)/8) = 0 |
| 14 | 7 | SLACK CYCLES BETWEEN NODE 10 AND 14 = ((4*2)/8) - ((3*2)/8) = 1 |
| 15 | 8 | SLACK CYCLES BETWEEN NODE 14 AND 15 = ((5*2)/8) - ((4*2)/8 = 0 |
| 19 | 9 | SLACK CYCLES BETWEEN NODE 15 AND 19 = ((6*2)/8) - ((5*2)/8) = 0 |
| 20 | 10 | SLACK CYCLES BETWEEN NODE 19 AND 20 = ((7*2)/8) - ((6*2)/8) = 0 |
| 3 | 1 | |
| 8 | 3 | |
| 13 | 6 | |
| 18 | 8 | |
| 1 | 0 | |
| 6 | 2 | |
| 11 | 5 | |
| 16 | 7 | |
| 2 | -1 | CANNOT PLACE IN CYCLE 0 DUE TO NODES 1, 20 |
| 7 | 1 | CANNOT PLACE IN CYCLE 2 DUE TO NODES 4, 6 |
| 12 | 4 | CANNOT PLACE IN CYCLE 5 DUE TO NODES 10, 11 |
| 17 | 6 | CANNOT PLACE IN CYCLE 7 DUE TO NODES 14, 16 |

EXTENSION OF SWING MODULO SCHEDULING TO EVENLY DISTRIBUTE UNIFORM STRONGLY CONNECTED COMPONENTS

CROSS REFERENCE TO RELATED APPLICATIONS

This application is a continuation of application Ser. No. 10/930,040, filed Aug. 30, 2004.

The present invention is related to an application entitled Modification of Swing Modulo Scheduling to Reduce Registry Usage, application Ser. No. 10/930,040 filed even date hereof, assigned to the same assignee, and incorporated herein by reference.

BACKGROUND OF THE INVENTION

1. Technical Field

The present invention relates generally to an improved data processing system, and in particular to a method and apparatus for processing data. Still more particularly, the present invention relates to a method, apparatus, and computer instructions for compiling code.

2. Description of Related Art

Software pipelining is a compiler optimization technique for reordering hardware instructions within a given loop of a computer program being compiled, so as to minimize the number of cycles required to execute each iteration of the loop. More specifically, software pipelining attempts to optimize the scheduling of such hardware instructions by overlapping the execution of instructions from multiple iterations of the loop.

For the purposes of the present discussion, it may be helpful to introduce some commonly used terms in software pipelining. As well known in the art, individual machine instructions in a computer program may be represented as "nodes" having assigned node numbers, and the dependencies and latencies between the various instructions may be represented as "edges" between nodes in a data dependency graph ("DDG"). A grouping of related instructions, as represented by a grouping of interconnected nodes in a data dependency graph, is commonly known as a "sub-graph". If the nodes of one sub-graph have no dependencies on nodes of another sub-graph, these two sub-graphs may be said to be "independent" of each other.

Software pipelining techniques may be used to attempt to optimally schedule the nodes of the sub-graphs found in a data dependency graph. A well-known technique for performing software pipelining is "modulo scheduling". Based on certain calculations, modulo scheduling selects a likely minimum number of cycles that the loops of a computer program will execute in, usually called the initiation interval ("II"), and attempts to place all of the instructions into a schedule of that size. Using this technique, instructions are placed in a schedule consisting of the number of cycles equal to the initiation interval. If, while scheduling, some instructions do not fit within initiation interval cycles, then these instructions are wrapped around the end of the schedule into the next iteration, or iterations, of the schedule. If an instruction is wrapped into a successive iteration, the instruction executes and consumes machine resources as though it were placed in the cycle equal to a placed cycle % (modulo operator) initiation interval.

Thus, for example, if an instruction is placed in cycle "10", and the initiation interval is 7, then the instruction would execute and consume resources at cycle "3" in another iteration of the scheduled loop. When some instructions of a loop are placed in successive iterations of the schedule, the result is a schedule that overlaps the execution of instructions from multiple iterations of the original loop. If the scheduling fails to place all of the instructions for a given initiation interval, the module scheduling technique iteratively increases the initiation interval of the schedule and tries to complete the schedule again. This is repeated until the scheduling is completed.

Swing modulo scheduling (SMS) is a known modulo scheduling technique designed to improve upon other known module scheduling techniques in terms of the number of cycles, length of the schedule, and registers used. More information on swing modulo scheduling may be found in Llosa et al., *Lifetime-Sensitive Modulo Scheduling in a Production Environment*, IEEE Transactions on Computers, vol. 50, no. 3, March 2001, pp. 234-249. Swing modulo scheduling has some distinct features. For example, swing module scheduling allows scheduling of instructions (i.e. nodes in a data dependency graph) in a prioritized order, and it allows placement of the instructions in the schedule to occur in both "forward" and "backward" directions.

In certain situations, swing modulo scheduling and other known software pipelining techniques may fail to find an optimal schedule. In particular, finding the optimal schedule may be difficult when there are multiple groups of instructions (i.e. sub-graphs) which are independent, and substantially identical in structure (for example, this may result from "unrolling" a loop of a computer program where there are no dependencies between the unrolled iterations). Attempted scheduling of such independent, and substantially identical groups of instructions using known scheduling techniques may result in a cumulative bunching of instructions at various spots within the schedule. This can lead to less than optimal scheduling of loops in terms of the number of execution cycles (i.e. the initiation interval). Regions of high register pressure (i.e. register pressure hot spots) also may result.

Therefore, it would be advantageous to have an improved method, apparatus and instructions for scheduling execution of instructions.

SUMMARY OF THE INVENTION

The present invention provides a method, apparatus, and computer instructions for scheduling instructions for execution. A series of instructions in a loop is identified. The series of instructions has a cyclic data dependency. A determination is made as to whether the series of instructions is a uniform series of instructions. Execution of the uniform series of instructions within the loop is scheduled to optimize execution of the loop in response to the identified series of instructions being the uniform series of instructions.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
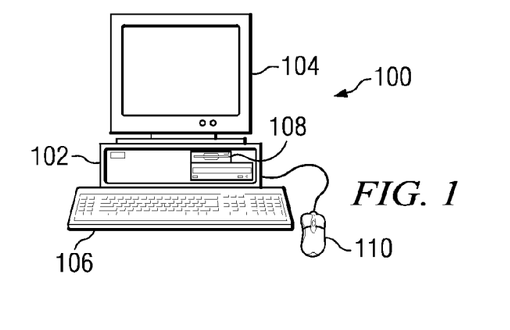
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eserver computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
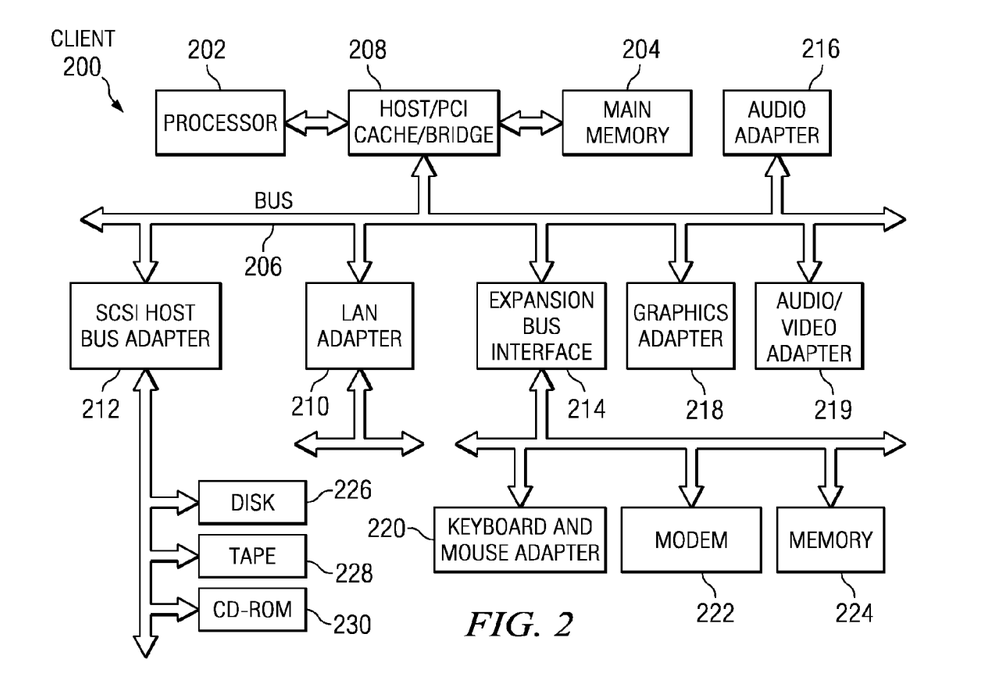
FIG. 2 is a block diagram of a data processing system shown in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in connectors. In the depicted example, local area network (LAN) adapter 210, small computer system interface (SCSI) host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java® may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

Figure 3:
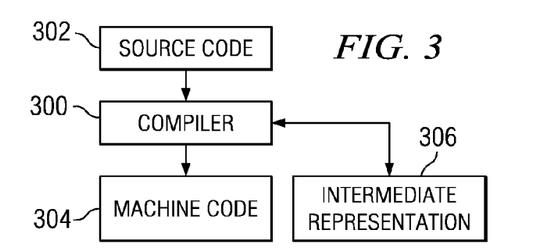
FIG. 3 is a diagram of components used in compiling software in accordance with a preferred embodiment of the present invention.

Turning next to FIG. 3, a diagram of components used in compiling software is depicted in accordance with a preferred embodiment of the present invention. Compiler 300 is software used to generate code for execution from code in a high-level language. Compiler first converts a set of high-level language statements into a lower-level representation. In this example, the higher-level statements are present in source code 302. Source code 302 is written in a high-level programming language, such as, for example, C and C++. Source code 302 is converted into machine code 304 by compiler 300.

In the process of generating machine code 304 from source code 302, compiler 300 creates intermediate representation 306 from source code 302. Intermediate representation 306 is processed by compiler 300 during which optimizations to the software may be made. After the optimizations have occurred, machine code 304 is generated from intermediate representation 306.

The present invention provides a method, apparatus and computer instructions for scheduling execution of instructions in code to optimize execution of the code. In these illustrative examples, software pipelining is a compiler optimization technique for reordering instructions within a given loop in a program being compiled to minimize the number of processor cycles required for the execution of each iteration of the loop. More specifically, software pipelining optimizes execution of code through overlapping the execution of different iterations of the loop. The mechanism of the present invention may be implemented as a process as a compiler, such as compiler 300 in FIG. 3.

Figure 4:
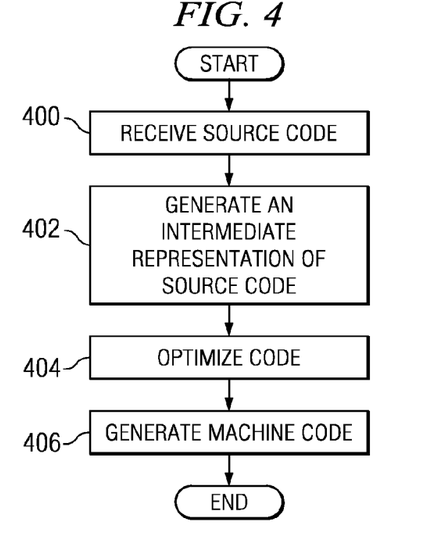
FIG. 4 is a flowchart of a process for generating code in accordance with a preferred embodiment of the present invention.

Turning now to FIG. 4, a flowchart of a process for generating code is depicted in accordance with a preferred embodiment of the present invention. The process illustrated in FIG. 4 may be implemented in a compiler, such as compiler 300 in FIG. 3.

The process begins by receiving source code (step 400). An intermediate representation of the source code is generated (step 402). Optimizations of the intermediate representation of the source code are performed (step 404). These optimizations may include, for example, optimizing scheduling of the execution of instructions. Machine code is then generated (step 406) with the process terminating thereafter.

The mechanism of the present invention may be implemented within step 404 in FIG. 4 as a part of the optimizations performed on the code. The mechanism of the present invention is based on swing modulo scheduling and modifies this scheduling system to identify strongly connected components in a data dependency graph. The mechanism of the present invention may perform loop unrolling and is designed to handle cases in which some remaining dependency between unrolled iterations of the loop are present. The dependencies that remain may form a strongly connected component (SCC).

A strongly connected component contains nodes that have a cyclic data dependency. For example, if node A leads to node B and node B leads back node A then a cyclic dependency is present. Since unrolled iterations of the loop comprise the same instruction sequence in a strongly connected component, a strongly connected component that connects the unrolled iterations will likely include a repeating pattern of instructions. This type of strongly connected component is called a uniform strongly connected component.

The mechanism of the present invention looks for a repeating pattern of instructions within a strongly connected component in a data dependency graph. Instructions for these uniform strongly connected components are spaced around the loop. In these examples, the mechanism attempts to space the instructions evenly around the loop. This type of scheduling provides a benefit of distributing instruction and register usage hot spots evenly around the loop when scheduling loops have undergone loop unrolling or have repeating sequences of instructions. As a result, instructions from each of the unrolled iterations or repeating sequences are evenly distributed around the loop so that these instructions will not compete for the same resources, and register usage is evenly spread around the loop. In this manner result, schedules for executing instructions may be made more optimal in the number of cycles and registered usage.

Figures 5, 6:
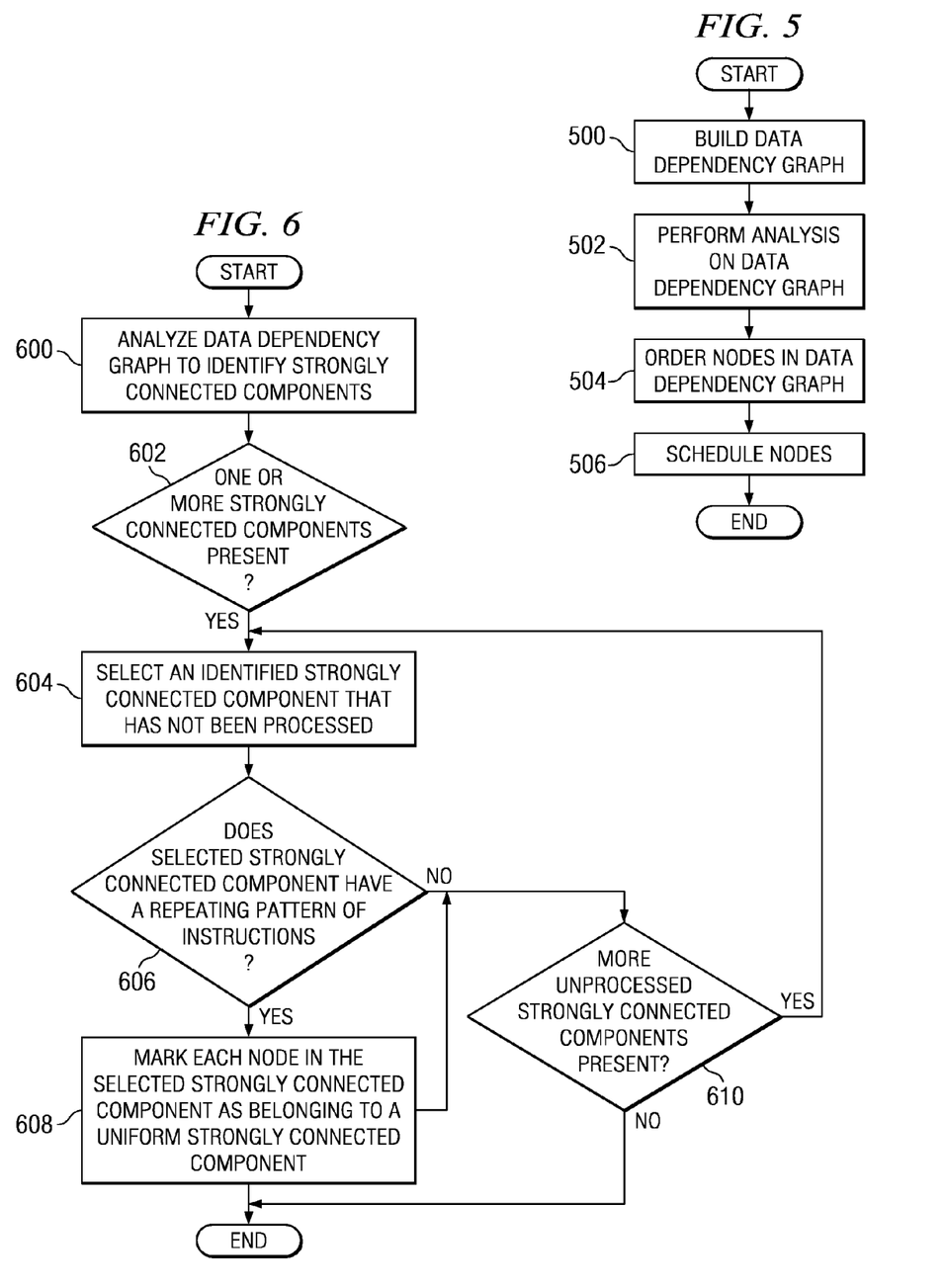
FIG. 5 is a flowchart of a process for performing swing modulo scheduling in accordance with a preferred embodiment of the present invention.
FIG. 6 is a flowchart of a process for analyzing a data dependency graph in accordance with a preferred embodiment of the present invention.

Turning now to FIG. 5, a flowchart of a process for performing swing modulo scheduling is depicted in accordance with a preferred embodiment of the present invention. This process is performed by compiler, such as compiler 300 in FIG. 3. The mechanism of the present invention may be implemented within this process in these illustrative examples.

The process begins by building a data dependency graph (step 500). Next, an analysis is performed on the graph (step 502). This analysis includes, for example, calculating the height, depth, earliest time, latest time, and slack for each node in the graph. In these examples, the nodes correspond to instructions.

Next, the nodes in the graph are ordered (step 504). The ordering in step 504 is performed based on the priority given to groups of nodes, such that the ordering always grows out from a nucleus of nodes rather than starting two groups of nodes and connecting them together. An important feature of this step is that the direction of ordering works in both the forward and backward direction, so that nodes are added to the order that are both predecessors and successors of the nucleus of previously ordered nodes.

When considering the first node, or when an independent section of the graph is finished, the next node to be ordered is selected from the pool of unordered nodes based on its priority (using minimum earliest time for forward direction and maximum latest time for backward direction). Then, nodes that are predecessors and successors to the pool of nodes are added to the ordering such that whenever possible, nodes that are added only have predecessors or successors already ordered, not both.

After the nodes are ordered, the ordered nodes are scheduled for execution (step 506) with the process terminating thereafter. This step looks at the nodes in the order set from step 504 of the algorithm, and places a node as close as possible (while respecting scheduling latencies) to its predecessors and successors. Again, because the order selected in step 502 can change direction freely between moving forward and backward, the scheduling step is performed in the forward and backward direction, placing nodes such that the nodes are in an appropriate number of cycles before successors or after predecessors.

Turning now to FIG. 6, a flowchart of a process for analyzing a data dependency graph is depicted in accordance with a preferred embodiment of the present invention. The process illustrated in FIG. 6 may be implemented in a compiler, such as compiler 300 in FIG. 3. This process may be implemented as part of step 404 in FIG. 4. More specifically, the process in FIG. 6 is initiated after a data dependency graph has been built from the code and provides a more detailed description of step 502 in FIG. 5 with respect to additional steps performed for the mechanism of the present invention.

The process begins by analyzing the data dependency graph to identify strongly connected components (step 600).

Next, a determination is made as to whether one or more strongly connected components are present from the analysis (step 602). This analysis is performed on the data dependency graph built in step 500 in FIG. 5. If one or more strongly connected components are present, a strongly connected component that has not been processed is selected for processing (step 604).

A determination is made as to whether the selected strongly connected component has a repeating pattern of instructions (step 606). This step determines whether the strongly connected component is a uniform strongly connected component. If a repeating pattern of instruction is present in the strongly connected component, each node in the selected strongly connected component is marked as belonging to a uniform strongly connected component (step 608). This marking may occur in various ways. For example, an indicator flag may be set for or in association with the node.

Thereafter, a determination is made as to whether additional unprocessed strongly connected components are present (610). If additional unprocessed strongly connected components are present, the process returns to step 604 as described above. Otherwise, the process terminates.

Figure 7:
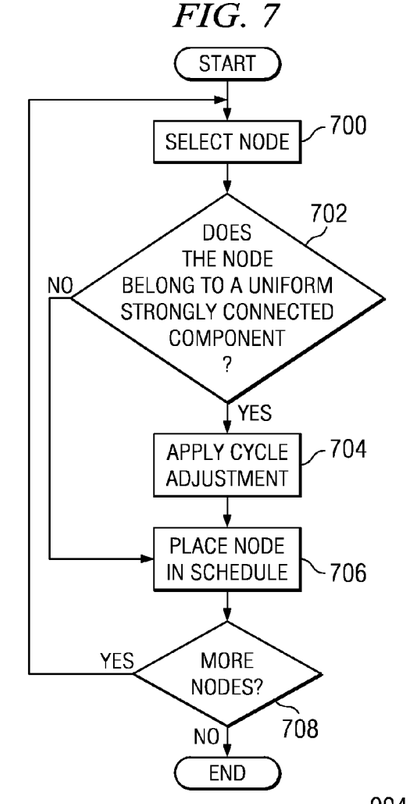
FIG. 7 is a flowchart for a process for scheduling execution of instructions in accordance with a preferred embodiment of the present invention.

Turning next to FIG. 7, a flowchart for a process for scheduling execution of instructions is depicted in accordance with a preferred embodiment of the present invention. The process illustrated in FIG. 7 may be implemented in a compiler, such as compiler 300 in FIG. 3. This process occurs after nodes have been ordered and is a more detailed description of step 506 with FIG. 5 with respect to the scheduling of instructions in uniform strongly connected components.

The process begins by selecting a node for processing (step 700). A determination is made as to whether the node belongs to a uniform strongly connected component (step 702). In this example, the determination may be made by checking a flag or indicator associated with the node. If the flag or indicator is set, then the node belongs to a uniform strongly connected component. If the node belongs to a uniform strongly connected component, a cycle adjustment is performed (step 704).

When scheduling instructions within a uniform strongly connected component, the mechanism of the present invention modifies the cycle in which the mechanism first tries to place each instruction. If the method of spacing out all instructions is used, then the mechanism of the present invention adds a number of slack cycles between two instructions, such as instruction a(i) and instruction b(i+1) for each instruction in the strongly connected component with N instructions, using the formula (where integer division is performed, and remainders are discarded):

(Slack cycles between instruction $a(i)$ and instruction $b(i+1)=(((i+1)*SCC\ \text{slack})/N)-((i*SCC\ \text{slack})/N)$ Thus, when scheduling instructions in a strongly connected component, the slack cycle calculation is performed depending on which instruction in the strongly connected component is being scheduled, and the current direction.

For example, when scheduling in the forward direction, if the current instruction is the third instruction out of six in the strongly connected component, and the strongly connected component slack is 8, then the slack cycles will be calculated between instruction 2 and instruction 3 (because of the forward direction) which will equal: $((3*8)/6)-((2*8)/6)=4-2=2$. Thus the first cycle which the scheduler will try to place instruction 3 of the strongly connected component will be two cycles later than the earliest cycle possible. Note that no slack cycles need to be inserted between the first and last instructions in a strongly connected component, since the spacing between instruction a(i) and instruction b(i+1) instructions numbering nodes from i=0 to i=N−1 will achieve the effect of spacing all of the instructions evenly around the loop.

However, the exact formula shown above is not required to achieve the spacing for the present invention. Other schemes may be used to space out the instructions. As one alternative, the slack cycles can be divided between the repeating sequences of instructions rather than between each individual instruction. To do this simply requires a small change to the formula above. If there are M repetitions of a sequence of instructions in a strongly connected component, then each instance of that sequence should be spaced out from other instances of the sequence by the following calculation:

Slack cycles between sequence $a(i)$ and $b(i+1)=(((i+1)*SCC\ \text{slack})/M)-((i*SCC\ \text{slack})/M)$ After a cycle adjustment has been performed in step 704, the node is placed into the schedule (step 706).

Once a cycle adjustment has been calculated in step 704, the cycle adjustment can be used as the starting point for where the node will be scheduled in step 706. Step 706 attempts to schedule the node starting with the cycle determined in step 704. If this scheduling fails, step 706 will attempt adjacent cycles until it succeeds, or all valid cycles have been unsuccessfully attempted. For example, if scheduling in the forward direction, and the earliest available cycle for node 3 is cycle 6, but step 704 determines an adjustment of 2 cycles, then step 706 will first attempt to schedule node 3 in cycle 8. If that fails, it can be made to attempt other valid cycles in a number of ways, but a preferred method is to try cycles in this order, where i is the initial cycle attempted: i, i+1, i−1, i+2, i−2, i+3, i−3, . . . until all valid cycles have been attempted. Thus, if the range of valid cycles for node 3 is 6 to 12, then step 706 would try to schedule node 3 in cycle 8, 9, 7, 10, 6, 11, 12. If the process in step 706 failed to schedule node 3 in any of those cycles, then it would have to give up and try a higher initiation interval.

Next, a determination is made as to whether additional nodes are present for scheduling (step 708). If additional nodes are present, the process returns to step 700. Otherwise, the process terminates. With reference back to step 702, if the node does not belong to a strongly connected component, the process proceeds to step 706 as described above.

Figure 8:
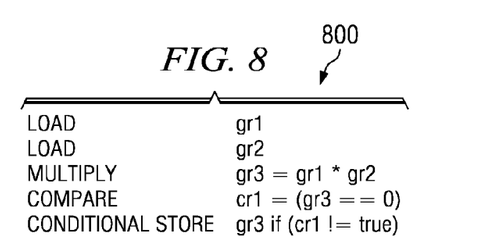
FIG. 8 is code for a loop that may be processed using the scheduling system in accordance with a preferred embodiment of the present invention.

The benefit of the invention is demonstrated in the following example. Consider a data processing system with a processor that can execute 2 instructions per cycle, and that has many general purpose registers (GPRs) but only 1 register available for holding condition values (called cr1). Assume that all latencies between dependent instructions are 1 cycle (issue to issue). Turning to FIG. 8, code for a loop that may be processed using the scheduling system of the present invention is depicted in accordance with a preferred embodiment of the present invention. Code 800 in FIG. 8 is an example of a loop that may be unrolled in processed in using the scheduling mechanism discussed above.

Figure 9:
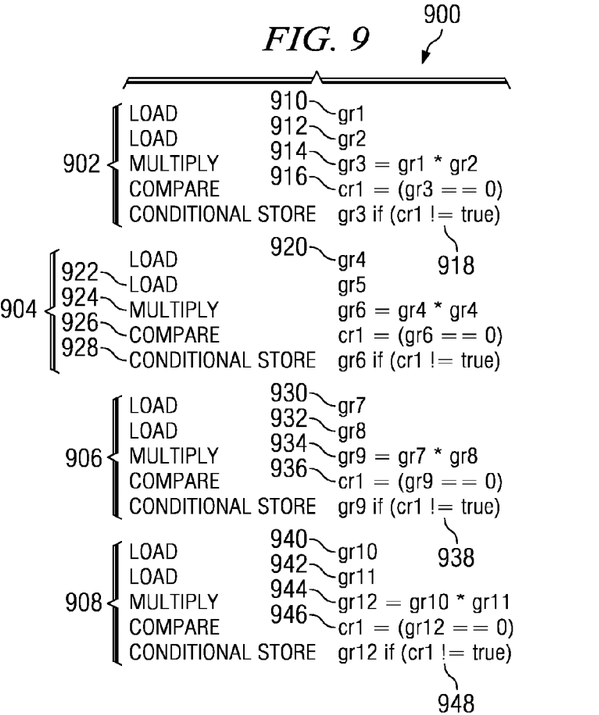
FIG. 9 is a diagram of the loop in FIG. 8 unrolled by four in accordance with a preferred embodiment of the present invention.

Turning next to FIG. 9, a diagram of the loop in FIG. 8 unrolled by four is depicted in accordance with a preferred embodiment of the present invention. Code 900 represents the loop in code 800 in FIG. 8 unrolled by four as can be seen in iterations 902, 904, 906, and 908. Each of these iterations represent an iteration of the loop. Iteration 902 contains instructions 910, 912, 914, 916, and 918; iteration 904 contains instructions 920, 922, 924, 926, and 928; iteration 906 contains instructions 930, 932, 934, 936, and 938; and iteration 908 contains instructions 940, 942, 944, 946, and 948.

When the loop is unrolled by four, then each unrolled iteration can be made to use different general purpose registers so their use does not interfere between unrolled iterations. In this illustrative example, the registers are renamed in each iteration such that registers gr1-gr12 are used. However, in this example only 1 condition register is present, so this register cannot be renamed.

Figure 10:
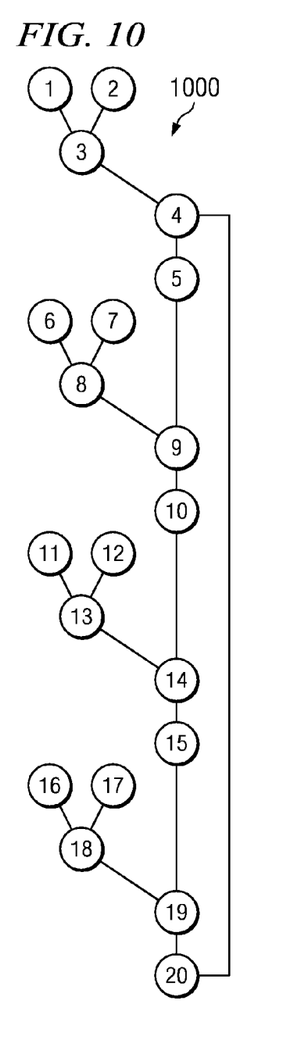
FIG. 10 is a diagram of a data dependency graph in accordance with a preferred embodiment of the present invention.

Turning next to FIG. 10, a diagram of a data dependency graph is depicted in accordance with a preferred embodiment of the present invention. Data dependency graph 1000 contains nodes 1-20, which correspond to instructions 910-948 in FIG. 9, respectively. For example, instruction 910 corresponds to node 1, instruction 912 corresponds to node 2, instruction 914 corresponds to node 3, and so on through 20.

A back edge from node 20 to node 4 is shown in this graph. The strongly connected component in data dependency graph 1000 contains nodes 4, 5, 9, 10, 14, 15, 19, and 20. These nodes all use condition register cr1 in this example. The swing modulo process algorithm then may generate an ordering for this loop of 4, 5, 9, 10, 14, 15, 19, 20, 3, 8, 13, 18, 1, 6, 11, 16, 2, 7, 12, and 17 for execution.

Figure 11:
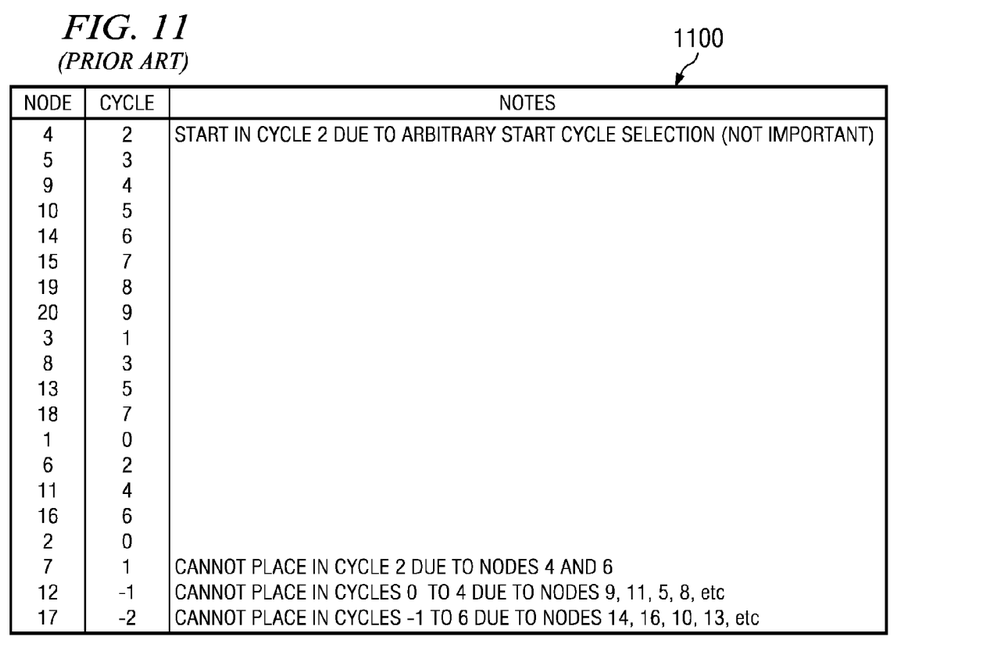
FIG. 11 is a diagram of a schedule for nodes using a known swing module scheduling process.

The swing modulo process then tries to generate a schedule. This schedule starts with an initiation interval (II) of 10 cycles (due to the resource constraints of 20 instructions, and 2 instructions/cycle). Turning next to FIG. 11, a diagram of a schedule for nodes using a known swing modulo scheduling process is depicted. Schedule 1100 is an example of a schedule generated by a known swing modulo scheduling process. In this schedule, the first eight nodes in schedule 1100 are in the strongly connected components.

Note that nodes 12 and 17 in schedule 1100 are quite far away from their dependent successors, nodes 13 and 18. This situation means that the registers they define have longer live ranges than is ideal. The general purpose register pressure for this schedule can be quickly estimated by counting the number of registers that are live at the start of each cycle.

Figure 12:
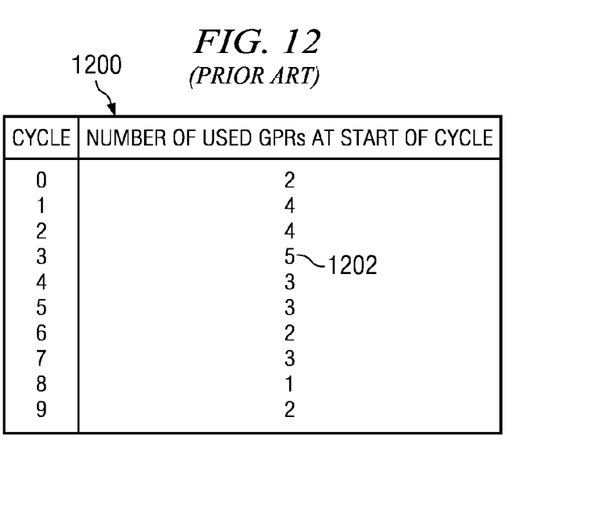
FIG. 12 is a live register table.

Turning now to FIG. 12, a live register table is depicted. Live register table 1200 shows the number of live general purpose registers that are present at the start of a cycle. A register is considered live until all of the instructions using the registers have finished executing. Live register table 1200 is generated using schedule 1100 in FIG. 11.

Notice in live register table 1200 the big difference in the general purpose register pressure at different points during the loop. At the maximum point, the general purpose register pressure is 5, and the minimum is 1. The distribution of instructions in the loop as shown in schedule 1100 in FIG. 11 is not a good distribution of register usage because the loop will need at least 5 registers allocated to execute, as can be seen from live register table 1200 in entry 1202 for cycle 3.

However, if the mechanism of the present invention is applied, then the scheduling phase spaces out the instructions in the strongly connected component.

Figure 13:
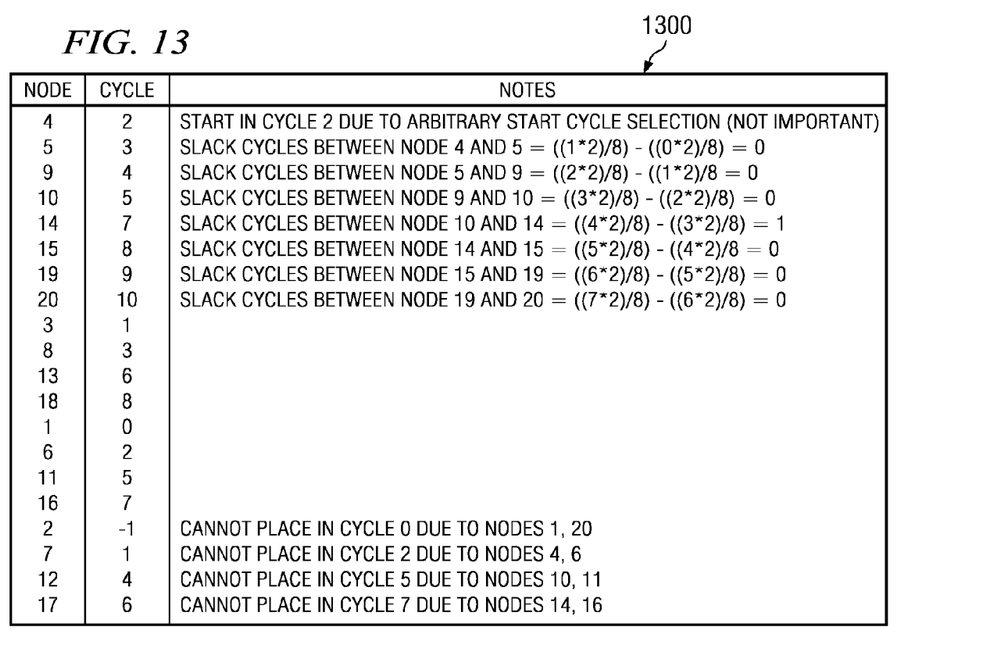
FIG. 13 is a schedule in accordance with a preferred embodiment of the present invention.

Turning now to FIG. 13, a schedule is depicted in accordance with a preferred embodiment of the present invention. This schedule is generated for the unrolled loop as shown in data dependency graph 1000 in FIG. 10. In scheduling instructions, the mechanism of the present invention uses a process similar to the flowchart in FIG. 6. Using this process, the mechanism of the present invention computes that the strongly connected component has 2 slack cycles in the illustrative example.

Figure 14:
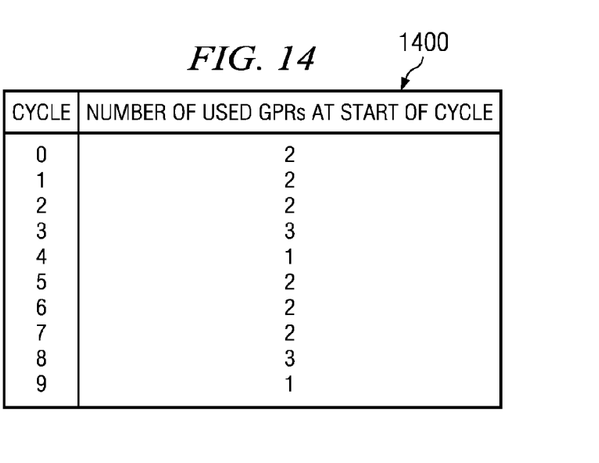
FIG. 14 is a live register table in accordance with a preferred embodiment of the present invention.

This type of scheduling results in an optimized use of registers. With reference to FIG. 14, a live register table is depicted in accordance with a preferred embodiment of the present invention. Live register table 1400 is an example of a table generated using schedule 1300 in FIG. 13.

Notice that the longest live range for a general purpose register in schedule 1300 is 2 cycles as shown in live register table 1400. The even spacing of instructions in the strongly connected component leads to a schedule that will only require 3 general purpose registers. In many situations, this kind of improvement leads to schedules with lower initiation intervals as well because it is easier to place instructions and keep the live ranges of registers as short as possible.

Thus, the present invention provides an improved method, apparatus and computer instructions for scheduling execution of instructions when uniform strongly connected components are present. This mechanism may be applied to loops that have been unrolled or repeating sequences of instructions. The mechanism of the present invention looks for a repeating pattern of instructions within a strongly connected component in a data dependency graph. Instructions for these uniform strongly connected components are spaced around the loop.

The scheduling through the mechanism of the present invention provides a benefit of distributing instruction and register usage hot spots evenly around the loop. As a result, instructions from each of the unrolled iterations or repeating sequences are evenly distributed around the loop so that these instructions will not compete for the same resources and register usage is evenly spread around the loop. As a result, schedules for executing instructions may be made more optimal in the number of cycles and registered usage.

Further, the mechanism of the present invention provides an improvement to the scheduling phase of the swing modulo scheduling process that does not have any significant additional cost in compilation time. The mechanism of the present invention simply uses the information about strongly connected components that is already calculated in a normal presently used swing modulo scheduling process implementation.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of media actually used to carry out the distribution. Examples of computer readable media include recordable-type media, such as a floppy disk, a hard disk drive, a RAM, CD-ROMs, and DVD-ROMs. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. For example, the illustrative embodiment is directed towards swing modulo scheduling. The mechanism of the present invention is not limited for this type of use. This mechanism may be applied to any loop scheduling process to space uniform strongly connected components evenly around loops. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for scheduling instructions for execution, the method comprising:
   identifying a series of instructions in a loop, wherein the series of instructions has a cyclic data dependency;

determining whether the series of instructions is a uniform series of instructions;

scheduling a spacing of the uniform series of instructions within the loop, wherein scheduling a spacing of the uniform series of instructions within the loop includes adding a number of slack cycles between a first instruction and a second instruction following the first instruction in the uniform series, wherein scheduling a spacing of the uniform series of instructions within the loop includes using the following:

spacing between instruction a(i) and instruction b(i+1) =(((i)*SCC slack/M)−((i+1)*SCC slack)/M), wherein i is an index number, a(i) is a first instruction, b(i+1) is a second instruction following the first instruction, strongly connected component slack is a target initiation interval minus a longest cyclic delay for any series of instructions having the cyclic data dependency in the loop, and M is a number of repetitions of a sequence of instructions in the series of instructions and wherein the spacing is in cycles; and responsive to the identified series of instructions being the uniform series of instructions, scheduling execution of the uniform series of instructions within the loop to optimize execution of the loop.

2. The method of claim 1, wherein the series of instructions is a strongly connected component.

3. The method of claim 1, wherein the execution of the loop is optimized by reducing a number of live general purpose registers present at a beginning of a cycle.

4. The method of claim 1, wherein the cyclic data dependency for the series of instructions is based on a single register used by the series of instructions.

5. The method of claim 1, wherein the scheduling step includes:

spacing instructions from the uniform series of instructions evenly within the loop.

6. The method of claim 1, wherein the identifying step, the determining step, and the scheduling step is performed by a compiler.

7. A computer program product in a computer readable, recordable-type medium in a data processing system for scheduling instructions for execution, the computer program product comprising:

first instructions for identifying a series of instructions in a loop, wherein the series of instructions has a cyclic data dependency;

second instructions for determining whether the series of instructions is a uniform series of instructions;

third instructions for scheduling a spacing of the uniform series of instructions within the loop, wherein scheduling a spacing of the uniform series of instructions within the loop includes adding a number of slack cycles between a first instruction and a second instruction following the first instruction in the uniform series, wherein the third instructions include:

sub-instructions for scheduling a spacing of the uniform series of instructions within the loop using the following:

spacing=(((b)*SCC slack/N)−((a*SCC slack)/N), wherein a is a first instruction, b is a second instruction following the first instruction, strongly connected component (SCC) slack is a target initiation interval minus a longest cyclic delay for any series of instructions having the cyclic data dependency in the loop, and N is a number of instructions and wherein the spacing is in cycles; and fourth instructions, responsive to the identified series of instructions being the uniform series of instructions, for scheduling execution of the uniform series of instructions within the loop to optimize execution of the loop.

8. The computer program product of claim 7, wherein the series of instructions is a strongly connected component.

9. The computer program product of claim 7, wherein the execution of the loop is optimized by reducing a number of live general purpose registers present at a beginning of a cycle.

10. The computer program product of claim 7, wherein the cyclic data dependency for the series of instructions is based on a single register used by the series of instructions.

11. The computer program product of claim 7, wherein the third instructions includes:

second sub-instructions for spacing instructions from the uniform series of instructions evenly within the loop.

12. The computer program product of claim 7, wherein the first instructions, the second instructions, and the third instructions are performed by a compiler.

13. The computer program product of claim 7, wherein the first instructions, second instructions, third instructions, and fourth instructions are implemented for use with swing modulo scheduling.

14. A computer program product in a computer readable, recordable-type medium in a data processing system for scheduling instructions for execution, the computer program product comprising:

first instructions for identifying a series of instructions in a loop, wherein the series of instructions has a cyclic data dependency;

second instructions for determining whether the series of instructions is a uniform series of instructions;

third instructions for scheduling a spacing of the uniform series of instructions within the loop, wherein scheduling a spacing of the uniform series of instructions within the loop includes adding a number of slack cycles between a first instruction and a second instruction following the first instruction in the uniform series, wherein the third instructions include:

sub-instructions for scheduling a spacing of the uniform series of instructions within the loop using the following:

spacing=(((b)*SCC slack/M)−((a*SCC slack)/M), wherein a is a first instruction, b is a second instruction following the first instruction, strongly connected component (SCC) slack is a target initiation interval minus a longest cyclic delay for any series of instructions having the cyclic data dependency in the loop, and M is a number of repetitions of a sequence of instructions in the series of instructions and wherein the spacing is in cycles; and fourth instructions, responsive to the identified series of instructions being the uniform series of instructions, for scheduling execution of the uniform series of instructions within the loop to optimize execution of the loop.

* * * * *